United States Patent [19]
Lee

[11] Patent Number: 5,348,984
[45] Date of Patent: Sep. 20, 1994

[54] EXPANDABLE COMPOSITION AND PROCESS FOR EXTRUDED THERMOPLASTIC FOAMS

[75] Inventor: Shau-Tarng Lee, Oakland, N.J.

[73] Assignee: Sealed Air Corporation, Saddle Brook, N.J.

[21] Appl. No.: 10,275

[22] Filed: Jan. 28, 1993

[51] Int. Cl.$^5$ ............................. C08J 9/08; C08J 9/14
[52] U.S. Cl. ...................... 521/79; 264/50; 521/81; 521/97; 521/143; 521/910
[58] Field of Search ................ 264/50; 521/79, 81, 521/143, 97, 910

[56] References Cited

U.S. PATENT DOCUMENTS

| | | |
|---|---|---|
| 2,770,608 | 11/1956 | Barker et al. . |
| 2,770,609 | 11/1956 | Symonds, Jr. . |
| 2,938,879 | 5/1960 | Mock et al. . |
| 3,558,752 | 1/1971 | Sen . |
| 3,644,230 | 2/1972 | Cronin . |
| 3,763,059 | 10/1973 | Needham et al. . |
| 3,787,542 | 1/1974 | Gallagher et al. . |
| 3,839,238 | 10/1974 | Ealding .................. 521/79 |
| 3,962,155 | 6/1976 | Usamoto et al. . |
| 3,966,373 | 6/1976 | Johnson . |
| 3,972,970 | 8/1976 | Taylor . |
| 4,070,310 | 1/1978 | Schneider et al. . |
| 4,080,344 | 3/1978 | Ikeda et al. . |
| 4,120,923 | 10/1978 | Kloker et al. . |
| 4,214,054 | 7/1980 | Watanabe et al. . |
| 4,308,352 | 12/1981 | Knaus . |
| 4,343,913 | 8/1982 | Watanabe et al. . |
| 4,464,484 | 8/1984 | Yoshimura et al. . |
| 4,581,382 | 4/1986 | Liberti et al. . |
| 4,640,933 | 2/1987 | Park . |
| 4,649,001 | 3/1987 | Nakamura et al. . |
| 4,694,026 | 9/1987 | Park . |
| 4,694,027 | 9/1987 | Park . |
| 4,698,191 | 10/1987 | Endo et al. . |
| 4,711,287 | 12/1987 | Kuwabara et al. . |
| 4,777,187 | 10/1988 | Weber et al. . |
| 4,925,606 | 5/1990 | Francis ...................... 521/79 |
| 5,000,991 | 3/1991 | Hayashi et al. . |
| 5,026,736 | 6/1991 | Pontiff . |
| 5,034,171 | 7/1991 | Kiczek et al. . |
| 5,035,275 | 7/1991 | Yamaguchi . |
| 5,180,751 | 1/1993 | Park ............................ 521/79 |
| 5,206,082 | 4/1993 | Malone ...................... 521/79 |
| 5,208,266 | 5/1993 | Yamazaki ................... 521/79 |
| 5,210,105 | 5/1993 | Paquet et al. ............. 521/79 |
| 5,240,968 | 8/1993 | Paquet et al. ............. 521/79 |

FOREIGN PATENT DOCUMENTS

| | | |
|---|---|---|
| 52-125839 | 10/1977 | Japan . |
| 52-155401 | 12/1977 | Japan . |
| 52-156201 | 12/1977 | Japan . |
| 53-17698 | 2/1978 | Japan . |
| 53-17699 | 2/1978 | Japan . |
| 53-17700 | 2/1978 | Japan . |
| 53-35709 | 3/1978 | Japan . |
| 53-55545 | 5/1978 | Japan . |

OTHER PUBLICATIONS

Japanese Abstract, JP1254742, Oct. 11, 1989.
Japanese Abstract, JP62153326, Jul. 8, 1987.

*Primary Examiner*—Morton Foelak
*Attorney, Agent, or Firm*—Bell, Seltzer, Park & Gibson

[57] ABSTRACT

An expandable thermoplastic composition is disclosed for extrusion foaming wherein the composition comprises a polyethylene resin; a blowing agent comprising a blend of about 50% by weight of carbon dioxide and about 50% by weight of either normal butane, isobutane, propane, or a mixture of any two or all three hydrocarbons in admixture with the resin in a ratio of about one part blowing agent to about 10 parts resin; zinc oxide nucleation agent in an amount of from about 0.05 to 0.5 kg per 100 kg of the resin; and glycerol monostearate aging modifier in an amount of from about 0.5 to 5 kg per 100 kg of the resin. A process for extrusion foaming of the composition is also disclosed.

28 Claims, No Drawings

EXPANDABLE COMPOSITION AND PROCESS FOR EXTRUDED THERMOPLASTIC FOAMS

FIELD OF THE INVENTION

This invention relates to an expandable composition for producing low density thermoplastic foams and a process for producing an expanded thermoplastic foam product of low density using an expandable thermoplastic composition. In particular, this invention relates to use of a blended blowing agent for incorporating into a plasticized thermoplastic resin for foaming by extrusion.

BACKGROUND OF THE INVENTION

Thermoplastic foam products can be produced by a wide variety of processes, of which extrusion is but one, that are in part responsible for the wide variety of foam products available today. Foams range in consistency from rigid materials suitable for structural use to flexible substances for soft cushions and packaging materials. These foams range in cellular formation from open or interconnecting-cell foams to closed or unicell foams. The cell structure may range from large to fine. Electrical, thermal, mechanical, and chemical properties can be varied within wide limits depending on the thermoplastic resin composition and the method chosen to create the foam. Foamed thermoplastics range in density anywhere from about 10 kg/m$^3$ to over 1,000 kg/m$^3$, although the latter perhaps more properly are called microcellular structures. True foams are considered to have a density of less than about 800 kg/m$^3$.

Many methods have been developed for the manufacture of foamed thermoplastics, which generally can be classified into three groups: 1) methods for adding a gaseous "blowing agent" to the thermoplastic during processing, 2) methods for producing a gaseous blowing agent in the thermoplastic during processing, and 3) methods for forming a thermoplastic mass from granules to obtain a cellular structure. Similar blowing agents sometimes are used in the various methods to produce foams. However, the effectiveness of a particular blowing agent varies considerably depending on the thermoplastic resin composition, the method chosen, the process conditions, the additives used, and the product sought.

Blowing agents work by expanding a thermoplastic resin to produce a cellular thermoplastic structure having far less density than the resin from which the foam is made. Bubbles of gas form around "nucleation sites" and are expanded by heat or reduced pressure or by a process of chemical reaction in which a gas is evolved. A nucleation site is a small particle or conglomerate of small particles that promotes the formation of a gas bubble in the resin. Additives may be incorporated into the resin to promote nucleation for a particular blowing agent and, consequently, a more uniform pore distribution. However, the foam is maintained by replacing the blowing agent in the cells with air. Diffusivity of the blowing agent out of the cells relative to air coming into the cells impacts the stability of the foam over time and whether the cells of the foam may collapse. Additives may be incorporated into the resin and process conditions may be adjusted to assist in controlling the diffusivity of the blowing agent, to promote foam stability, and to limit collapse of the foam to acceptable limits.

Methods for producing a blowing agent in situ usually involve a chemical reaction that evolves gas. Polyethylene, silicone, epoxy, and vinyl foams have all been produced by adding a substance that will produce a gaseous blowing agent chemically. For example, dinitroso compounds and hydrazides, which evolve nitrogen gas on decomposition, and bicarbonates, which evolve carbon dioxide, have been added to thermoplastic resins to produce foams.

Polystyrene foams often are produced by "bead molding," in which partially expanded granules or beads are heated in a mold in the presence of a blowing agent to expand and fuse the particles into a rigid unicellular structure. A volatile organic compound or some other gaseous blowing agent is impregnated into the beads. Heat is applied and the pressure is released to cause the beads to expand and fuse.

There are several methods for adding a blowing agent to a thermoplastic resin during processing to produce a foam. Ureaformaldehyde and polyvinylformaldehyde foams have been produced by whipping air into a heated thermoplastic mass before it sets. Polyolefinic foams have been produced by introducing air or some other gas or volatile solvent into a heated thermoplastic polyolefin mass and then heating the mass or reducing pressure to expand the gas and form pores of a desirable size. One more specific method is to impregnate a thermoplastic resin with blowing agent under heat and pressure in a closed vessel. The pressure is released to expand the blowing agent to form "prefoamed," or partially expanded, beads. Prefoamed beads usually are further expanded in an enclosed vessel such as a mold to produce a molded foam product, such as is discussed hereinabove.

Another more specific method, to which the invention claimed herein relates, is to mix the blowing agent with molten resin under pressure and then extrude the mixture through a forming die into a zone of reduced pressure. Shaped extruded foams can be produced by this method using a forming die of particular configuration. Plank, which can be cut to a desirable shape, and thin foam sheets are produced in this manner.

Many of the halogenated hydrocarbons have been used for several years as blowing agents in various methods for producing foams from thermoplastic resins. The halogenated hydrocarbons include the chlorofluorocarbons ("CFCs") and hydrochlorofluorocarbons ("HCFCs"). CFCs and HCFCs are readily impregnable in thermoplastic resins and are readily expandable under relatively mild conditions. CFCs and HCFCs generally produce foams of high quality with a minimum of processing difficulty. The pore size is controllable, the foam has good stability with minimum tendency to collapse after a period of time, and the surface characteristics of the foam are smooth and desirable. Also, CFCs, HCFCs, and other halogenated hydrocarbons typically are either not flammable or are of low flammability, which greatly reduces the care with which they may be used. These compounds have the further advantage of low toxicity. However, governmental regulation is phasing out use of halogenated hydrocarbons because the halogenated hydrocarbons may be responsible for damage to the earth's ozone layer.

Producers of thermoplastic foam products have been seeking alternatives to CFC and HCFC blowing agents for a number of years to reduce or eliminate altogether the amount of halogenated hydrocarbons used. A number of volatile organic compounds (VOCs) have been proposed, although many of these also are somewhat objectionable. VOCs include the light aliphatic hydrocarbons such as propane, n-butane, isobutane, butylene, isobutene, pentane, neopentane, and hexane, to name but a few. The diffusivity of VOCs can be many times faster than that of the halogenated hydrocarbons and harder to control. Foam collapse and stability problems have been encountered, although high quality foams can be produced using VOCs. Also, VOCs typically are flammable, thus presenting handling problems and safety concerns.

Inert gases have also been proposed as blowing agents, although these sometimes do not provide acceptable results, especially for producing extruded foams. Inert gases include nitrogen, argon, xenon, krypton, helium, and carbon dioxide. Nitrogen and carbon dioxide, in particular, have the advantage of being inexpensive, readily available, and of not being flammable, and are not considered to be harmful to the earth's ozone layer. However, inert gases usually are not as readily soluble in thermoplastic resins as CFCs, HCFCs, and VOCs, are of higher volatility, and do not reduce the viscosity of the resin. Lubricants often are added to the resin for extrusion foaming. The range of processing conditions for producing acceptable products is narrower than for CFCs, HCFCs, and VOCs. Mixing the resin with an inert blowing agent and keeping the inert blowing agent in the resin is more complicated than for CFCs, HCFCs, and VOCs. The surface texture of extruded foams sometimes is rough. Extruded low density foams and thick foams are difficult to achieve. The foam sometimes has poor stability and foam shrinkage sometimes is uncontrollable.

As examples of the use of various blowing agents for molding and prefoamed bead production, Kloker et al. U.S. Pat. No. 4,120,923 and Yoshimura et al. U.S. Pat. No. 4,464,484 disclose the use of the inert gas carbon dioxide as a blowing agent for molded polyolefin foam articles and for polymer beads, respectively. Yoshimura et al. U.S. Pat. No. 4,464,484 disclose that a mixture of carbon dioxide and aliphatic hydrocarbons and halogenated aliphatic hydrocarbons, including CFCs and HCFCs, are useful blowing agents for polyolefin beads. Broad ranges of blends of VOCs, CFCs, and HCFCs with carbon dioxide are disclosed and mixtures of butane or dichlorodifluoromethane and carbon dioxide are exemplified.

However, no suggestion is made that any of these blended blowing agents for prefoamed beads would be useful for producing extruded thermoplastic foams. Extrusion and prefoamed bead production are different processes that produce entirely different products and are not processes that can be substituted one for the other. A blowing agent may produce a foam product having desirable characteristics in one process, but not in the other.

Extrusion foaming and prefoamed bead production differ in at least the following respect. Extrusion foaming is a continuous process in which a plasticized thermoplastic resin is cooled and expanded when the resin and blowing agent are extruded into a zone of lower pressure. On the other hand, the process for producing prefoamed beads is a batch process in which a solid resin is impregnated with a blowing agent, typically at a relatively lower temperature than extrusion foaming, and heated to expand the blowing agent.

The conditions at which extrusion foaming and prefoamed bead production occur further illustrate the differences in these processes. In prefoamed bead production, the resin usually is solid and so impregnation with blowing agent can take up to an hour or more. On the other hand, mixing of blowing agent with polyethylene resin for extrusion foaming can take place in as little as few minutes or less because the resin is plasticized. Nucleating and stability control agents typically are used in extrusion foaming, even for CFC and HCFC blowing agents, to control cell formation, diffusivity of the blowing agent, and stability of the foam. Nucleating and stability control agents typically are not used in prefoamed bead production. Also, a medium such as water or glycol typically is used as a dispersion medium for the polymer particles in prefoamed bead production. No such medium is needed or used for extrusion foaming.

As an example of extrusion foaming, Watanabe et al. U.S. Pat. No. 4,214,054 disclose numerous volatile organic blowing agents including various CFCs, VOCs, and the use of decomposable gas-releasing chemical blowing agents for producing extruded polyolefin foams from particular resin compositions.

Nakamura et al. U.S. Pat. No. 4,649,001 propose preparing long, thin sheets of low density polyethylene foams by extruding a resin mixture of low density polyethylene and linear low density polyethylene. The extruded foam sheet is drawn at a rate faster than the extrusion rate to produce long, thin sheets. Foaming agents are said to include inorganic gases such as carbon dioxide and a number of VOCs and HCFCs. No specific blends of blowing agents are suggested. Nakamura et al. is directed to the problem of producing long, thin sheets from a thermoplastic resin that has produced foams of small elongation and inferior tensile strength, but does not recognize the problems associated with using either carbon dioxide or butane alone as a blowing agent.

Johnson U.S. Pat. No. 3,966,373 proposes a method and apparatus for making relatively dense structural foam profiles having a foam core and a dense skin. A partially expanded extruded thermoplastic polymer composition is conveyed through a chilled shaping passage moving at the same rate as the foam to eliminate friction. The dense skin is formed by the chilled passage while the polymer resin is still expanding. Foaming agents are said to include nitrogen, carbon dioxide, lower molecular weight paraffins such as propane, butane, and methylchloride, lower molecular weight olefins such as ethylene, propylene, and butylene or mixtures of the above. No specific mixtures of foaming agents are disclosed. A preferred thermoplastic composition for extrusion to form tongue depressors or ice cream sticks of 320 to 1000 kilograms per cubic meter is disclosed to include polystyrene beads having a pentane blowing agent integrated therewith.

Kiczek et al. U.S. Pat. No. 5,034,171 propose a process for producing extruded thermoplastic foams wherein inert gases including nitrogen, carbon dioxide, and others are used as the sole blowing agent, without blending with CFCs, HCFCs, or VOCs. Inert gases such as nitrogen, carbon dioxide, and others would be particularly preferred blowing agents for extruded polyolefin foams because these gases typically are relatively inexpensive and are not considered harmful to the ozone layer. However, inert gas blowing agents generally have not proved suitable for producing extruded polyolefin foams, as discussed hereinabove.

An alternative blowing agent for extruded thermoplastic foams, a process for producing extruded foams using such a blowing agent, and a thermoplastic resin composition containing such a blowing agent would be desirable that avoid or substantially reduce the impact of the problems typically associated with CFCs, HCFCs, VOCs, and inert gases in producing extruded foams and are capable of producing foams having acceptable pore structure, density, and stability.

SUMMARY OF THE INVENTION

The invention claimed herein relates to the use of a blowing agent for extrusion foaming of relatively low density polyolefin foams wherein the blowing agent is a blend of carbon dioxide and a hydrocarbon selected from among normal butane, isobutane, propane, or a mixture of any two or all three of these hydrocarbons. This blended blowing agent substantially reduces the problems associated with inert gas blowing agents, VOCs, CFCs, and HCFCs. It has been discovered that a thermoplastic composition containing this carbon dioxide and hydrocarbon blend of blowing agents produces extruded polyolefin foams having the requisite pore structure, density, and dimensional stability. Extruded foams produced with this blowing agent blend have a density after seven days from extrusion of from at least about 20 kilograms per cubic meter to at least about 40 kilograms per cubic meter, which is an acceptable and stable foam density.

In more specific embodiments, the blowing agent for extrusion foaming of polyolefin foam products is a blend of carbon dioxide and normal butane, isobutane, propane or mixtures thereof in which carbon dioxide is present in a ratio of from about 1:3 to 3:1 by weight, which is from 25 to 75 percent by weight. The expandable composition for producing extruded polyolefin foam products having dimensional stability is a plasticized polyolefin resin mixed with such a blended blowing agent. Preferably, the expandable composition will also contain an aging or diffusivity modifier and a nucleation agent for controlling the size of the cells of the foam.

In a still more specific embodiment, the expandable composition includes a polyethylene resin, about 0.5 to 5 kilograms of glycerol monostearate per 100 kilograms of the resin, about 0.05 to 0.5 kilograms of zinc oxide per 100 kilograms of the resin, and about 1 to 20 kilograms of blowing agent per 100 kilograms of the resin, which blowing agent has about equal amounts by weight of carbon dioxide and either normal butane, isobutane, propane, or mixtures thereof.

The invention also relates to a process for producing an expanded polyolefin foam wherein a plasticized polyolefin resin is mixed with the blowing agent blend and then extruded through an extruder to produce the foamed polyolefin product.

DETAILED DESCRIPTION OF THE PREFERRED EMBODIMENTS

Various processes and equipment for extrusion foaming of thermoplastic resins have been used for many years. Generally, solid pellets of thermoplastic resin are fed through a hopper to a melting zone in which the resin is melted, or plasticized, to form a flowable thermoplastic mass. The plasticized thermoplastic mass generally is then metered to a mixing zone where the thermoplastic mass is thoroughly mixed with a blowing agent under pressure for subsequent cooling and expansion of the resin to form a foam. Blowing agent typically is injected between the metering and the mixing zones. The mixture of thermoplastic resin and blowing agent is then forced through a die, which imparts a shape to the thermoplastic mass, into a zone of lower pressure, such as atmospheric pressure. The blowing agent expands to form the cells of the foam and the thermoplastic foam is cooled.

Typical of much of the equipment used for extrusion of thermoplastic foams, the thermoplastic pellets are conveyed from a hopper through the melt zone, the mixing and cooling zones, and extruded through the die by a screw type apparatus. Single screw extruders are common, although double screw extruders sometimes are used for greater mixing.

When a blowing agent is injected into the mixing zone of the screw extruder, the blowing agent initially forms a dispersion of insoluble bubbles within the plasticized thermoplastic mass. These bubbles eventually dissolve in the thermoplastic mass as the mixing continues and the pressure increases down the length of the extruder. The extruder should have a length to diameter ratio of at least 30:1 and a sufficient length of mixing zone to ensure that proper mixing occurs.

Thermoplastic resins contemplated for use in the practice of the invention claimed herein include the polyolefin resins. Polyolefin resins may be defined as polymers derived from unsaturated hydrocarbons containing the ethylene or diene functional groups. Polyolefin resins may include virtually all of the addition polymers, however, the term polyolefin typically is used for polymers of ethylene, the alkyl derivatives of ethylene (the alphaolefins), and the dienes. Among the more commercially important polyolefins are polyethylene, polypropylene, polybutene, and their copolymers. Polyethylene resins are particularly useful in the practice of the invention claimed herein.

Polyethylene is a whitish, translucent polymer of moderate strength and high toughness. Polyethylene is available in forms ranging in crystallinity from 50 to 95 percent. Polyethylene is available in low, medium, and high density polymer forms. For the low density material, the softening temperature is about 105° C. to 115° C. For the high density material the softening temperature is some 25° C. to 40° C. higher, or from about 130° C. to 140° C. Low, medium, and high density polyethylenes are suitable for extrusion foaming, including mixtures thereof. The thermoplastic resin should be maintained at a temperature within a range above the melting point of the polymer that is sufficiently high so that the polymer has sufficient fluidity for mixing with blowing agent. This range normally will be from about 20° C. to 100° C. above the melting point of the resin. The melting zone can be maintained at a somewhat lower temperature due to the heat that is generated by friction as the plasticized resin flows through the extruder.

After mixing, the temperature of the mixture of resin and blowing agent should be lowered closer to the melting point of the mixture so that the polymer maintains its structure upon foaming, but not so much that complete expansion is hindered. The blowing agent has a plasticizing effect on the resin reducing its viscosity, or resistance to flow, and so the melting point of the mixture of resin and blowing agent normally is below that of the resin alone. The expansion temperature, which is above the melting point of the mixture, is empirically determined and depends upon the composition of the resin, the length of the screw, whether single or double screws are used, on the specific resin, upon the amount of blowing agent, and the specific blowing agent blend. For a low density polyethylene, the expansion temperature will generally be in the range of from about 85° C. to 120° C.

The blowing agent contemplated for use in practicing the invention claimed herein comprises a mixture of carbon dioxide and either normal butane, isobutane, propane or mixtures of any two or all three of these hydrocarbons. Carbon dioxide should be present in a ratio of from about 1:3 to 3:1, which is from about 25 to 75 percent by weight of the blowing agent blend. A mixture of about 50 percent carbon dioxide by weight and 50 percent of either normal butane, isobutane, propane, or mixtures thereof is particularly preferred. The blowing agent is mixed into the plasticized polyethylene polymer resin in proportions to achieve the desired degree of expansion in the resulting foamed cellular product. Stable foam densities from 40 kg/m$^3$ down to as low as 20 kg/m$^3$ may be made by practice of the invention.

The blowing agent generally is mixed with the resin in a ratio of about one part blowing agent to ten parts resin. The maximum useful proportion of blowing agent in the plasticized resin is affected by the pressure that is maintained on the resin in the extrusion die passage, as is believed to be well known to the skilled artisan.

The benefits of using the blowing agent blend of the invention claimed herein may be enhanced by using a combination of a nucleation agent and an aging modifier to control cell size and development and to control the replacement of blowing agent with air in the cells of the foam, respectively. In particular, it has been found that a combination of low levels of zinc oxide nucleation agent and glycerol monostearate aging modifier is useful to further reduce the density of the foams produced and results in a thickness increase.

The glycerol monostearate is mixed with the polyethylene resin prior to melting in an amount sufficient to produce a desirable rate of exchange of air with blowing agent in the cells of the foam. More specifically, the glycerol monostearate is mixed with the polyethylene resin prior to melting in an amount from about 0.5 to 5 kg per 100 kg of polyolefin resin. Still more specifically, glycerol monostearate is added in an amount of 1 kg per 100 kg of polyolefin resin.

Zinc oxide nucleation agent is mixed with the resin in an amount sufficient to promote nucleation and to develop a pore structure of the desired size. More specifically, zinc oxide nucleation agent is mixed with the resin in an amount of from about 0.05 to 0.5 kg per 100 kg of polyolefin resin. Still more specifically, zinc oxide is added to the resin in an amount of 0.1 kg per 100 kg of polyolefin resin.

The following table compares the results achieved using examples of the blowing agent of the present invention (Runs 1 and 2) to examples of 100 percent isobutane blowing agent (Run 3), 100 percent carbon dioxide blowing agent (Run 4), and a mixture of carbon dioxide and hydrofluorocarbon 152-a (Run 5). In all cases, the resin is a low density polyethylene.

TABLE 1

| Run | Blowing Agent | B.A. Level kg/hr | Die Melt Temp. °C. | Foam Den. kg/m$^3$ 0 | 1 Day | 7 Days |
|---|---|---|---|---|---|---|
| 1 | CO$_2$/Isobutane | 10.0 | 106 | 34 | 27 | 28 |
| 2 | CO$_2$/N-butane | 10.0 | 100 | 40 | 34 | 34 |
| 3 | Isobutane | 16.5 | 85 | 19 | 17 | 18 |
| 4 | CO$_2$ | 1.4 | 94 | 66 | 90 | 80 |
| 5 | CO$_2$/HFC-152a | 2.1 | 85 | 43 | 44 | 42 |

As shown in the table, the blowing agent blend of the invention claimed herein produced a superior foam having a desirable foam density that remains stable for seven days after extrusion. The pure carbon dioxide blowing agent produced a foam having a higher density.

A single screw extruder was used for Runs 1 through 3 having a length to diameter ratio of 48:1. The melting zone was maintained at 77° Centigrade and the resin flow rate was maintained at 100 kg/hr. The resin had a melt index of 1 and a density of 922 kg per cubic meter. A glycerol monostearate aging control additive was mixed with the resin at a rate of 1 kg/hr. A zinc oxide nucleation control agent was mixed with the resin at the rate of 0.1 kg/hr.

Runs 4 and 5, which use 100 percent carbon dioxide blowing agent and a mixture of carbon dioxide and hydrofluorocarbon 152-a, respectively, were conducted using a counter-rotating twin screw extruder to provide greater mixing and were conducted at a slower resin flow rate with relatively higher amounts of nucleating agent and aging control additive. The resin flow rate was 39 kg/hr. The expandable composition included additives of 0.1 kg/hr fluoropolymers (PPA-225, 3M), 0.065 kg/hr zinc oxide nucleating agent, and 0.38 kg/hr glycerol monostearate aging control additive. These modifications were made due to the relative insolubility of the carbon dioxide and the carbon dioxide and fluorocarbon blowing agent mixture in the polyethylene resin. The fluoropolymers were added to provide a lubricating effect at the extrusion die.

The invention claimed herein has been described hereinabove with respect to particular preferred embodiments. These embodiments should be considered illustrative of and not in limitation of the invention claimed herein. The full scope of the invention should be judged in accordance with the appended claims and equivalents thereto.

What is claimed is:

1. An extrudable, expandable composition for producing stable, low density polyolefin foam products having a stable foam density of from about 20 kg/m$^3$ to 40 kg/m$^3$, said composition comprising:
   a) a plasticized polyolefin resin; and
   b) a blowing agent for expanding the composition comprising carbon dioxide and a hydrocarbon selected from the group consisting of n-butane, isobutane, propane, and mixtures thereof, wherein said carbon dioxide and said hydrocarbon are present in a ratio by weight of from about 1:3 to 3:1, whereby said hydrocarbon is present in an amount sufficient to reduce the viscosity of the resin and to produce a stable foam with a decreased density and desirable surface texture over that of carbon dioxide alone, without substantially increasing the flammability of the blowing agent.

2. The expandable composition of claim 1 wherein said polyolefin resin includes an aging modifier present in an amount sufficient to control the shrinkage of the foam and a nucleation agent present in an amount sufficient to promote a uniform pore structure.

3. The expandable composition of claim 1 wherein said polyolefin resin includes an aging modifier present in an amount of from about 0.5 to 5 kg per 100 kg of resin, a nucleation agent present in an amount of from about 0.05 so 0.5 kg per 100 kg of resin, and wherein said blowing agent is present in an amount of from about 20 kg per 100 kg of resin.

4. The expandable composition of claim 1 wherein said polyolefin resin is a polyethylene resin and includes glycerol monostearate and zinc oxide.

5. The expandable composition of claim 1 wherein said carbon dioxide and said hydrocarbon are present in about equal amounts by weight.

6. An expandable composition for producing low density polyethylene foam products having a stable foam density of from about 20 kg/m$^3$ to 40 kg/m$^3$, said composition comprising:
 a) a plasticized polyethylene resin;
 b) an aging modifier in an amount of from about 0.5 to 5 kg per 100 kg of resin;
 c) a nucleation agent in an amount of from about 0.05 to 0.5 kg per 100 kg of resin; and
 d) a blowing agent in an amount of from about 1 kg to 20 kg per 100 kg of resin for expanding the composition, said blowing agent comprising a blend of from about 25% to 75% by weight of carbon dioxide and from about 75% to 25% of a hydrocarbon selected from the group consisting of n-butane, isobutane, propane, and mixtures thereof.

7. The expandable composition of claim 6 wherein said aging modifier is glycerol monostearate and said nucleation agent is zinc oxide.

8. The expandable composition of claim 7 wherein said glycerol monostearate is present in an amount of about 1.0 kg per 100 kg of resin and said zinc oxide is present in an amount of about 0.1 kg per 100 kg resin.

9. The expandable composition of claim 8 wherein said blowing agent is present in an amount of about 10 kg per 100 kg of resin.

10. The expandable composition of claim 8 wherein said blowing agent comprises a blend in about equal amounts by weight of carbon dioxide and a hydrocarbon selected from the group consisting of n-butane, isobutane, propane, and mixtures thereof.

11. An expandable composition for producing low density polyethylene foam products having a stable foam density of from about 20 kg/m$^3$ to 40 kg/m$^3$ said composition comprising:
 a) a plasticized low density polyethylene resin;
 b) glycerol monostearate in an amount of about 1.0 kg per 100 kg of resin;
 c) zinc oxide in an amount of about 0.1 kg per 100 kg of resin; and
 d) a blowing agent in an amount of about 10 kg per 100 kg of resin, said blowing agent comprising by weight about 50% carbon dioxide and about 50% of a hydrocarbon selected from the group consisting of n-butane, isobutane, propane, and mixtures thereof.

12. A process for producing an extruded, low density polyolefin foam product having a stable foam density of from about 20 kg/m$^3$ to 40 kg/m$^3$, said process comprising the steps of:
 a) mixing a blowing agent with a plasticized polyolefin resin, the blowing agent comprising a blend of carbon dioxide and a hydrocarbon selected from among the group consisting of n-butane, isobutane, propane, and mixtures thereof; and
 b) extruding the mixture of resin and blowing agent so as to produce a low density foamed polyolefin product.

13. The process of claim 12 wherein the blowing agent and plasticized polyolefin resin are mixed in the melting zone of an extruder at a temperature above the melting point of the resin that is sufficient to provide fluidity for mixing.

14. The process of claim 13 wherein the temperature of the resin in the melting zone is from about 20° C. above the melting point of the resin to about 100° C. above the melting point of the resin.

15. The process of claim 12 wherein the step of extruding the mixture of resin and blowing agent comprises extruding the mixture through a die orifice into a zone of reduced pressure to expand the resin, and controlling the temperature of the polyolefin resin so that the polymer maintains its structure upon expansion and expansion is not substantially hindered.

16. A process for producing an expanded low density polyethylene foam product having a stable foam density of from about 20 kg/m$^3$ to 40 kg/m$^3$, said process comprising the steps of:
 a) mixing a blowing agent comprising from about 25% to 75% by weight of carbon dioxide and from about 75% to 25% by weight of a hydrocarbon selected from among the group consisting of n-butane, isobutane, propane, and mixtures thereof with a plasticized polyethylene resin, an aging modifier, and a nucleation agent in the melting zone of an extruder;
 b) extruding the mixture of blowing agent and resin through the orifice of the extruder; and
 c) expanding the mixture so as to produce a dimensionally stable foam product.

17. The process of claim 16 wherein the resin in the melting zone of the extruder is at a temperature of from about 20° C. above the melting point of the resin to 100° C. above the melting point of the resin.

18. The process of claim 16 wherein said step of extruding the mixture is continuous.

19. The process of claim 16 wherein said blowing agent is present in said mixture in an amount of from about 1 kg to 20 kg per 100 kg of resin.

20. The process of claim 16 wherein said blowing agent is present in said mixture at an amount of about 10 kg per 100 kg of resin.

21. The process of claim 16 wherein said aging modifier is glycerol monostearate and is present in an amount sufficient to produce a stable foam having a density after seven days from expansion of from about 20 to about 40 kg/m$_3$.

22. The process of claim 16 wherein said aging modifier is glycerol monostearate and is present in an amount of from about 0.5 kg to 5 kg per 100 kg of resin.

23. The process of claim 16 wherein said glycerol monostearate is present in an amount of about 1 kg per 100 kg of resin.

24. The process of claim 16 wherein said nucleation agent is zinc oxide and is present in an amount sufficient to promote a foam having a uniform pore structure.

25. The process of claim 16 wherein said nucleation agent is zinc oxide and is present in an amount of from about 0.05 to about 0.5 kg per 100 kg of resin.

26. The process of claim 25 wherein said zinc oxide is present in an amount of about 0.1 kg per 100 kg of resin.

27. The process of claim 16 wherein said mixing step takes place in from about one to three minutes.

28. A process for producing an expanded low density polyethylene foam product, said process comprising the steps of:

a) mixing over a period of time of about 1 to three minutes in the melting zone of an extruder a blowing agent comprising from about 25% to 75% by weight of carbon dioxide and from about 75% to 25% by weight of a hydrocarbon selected from among the group consisting of n-butane, isobutane, propane, and mixtures thereof with a plasticized low density polyethylene resin composition at a melt temperature of from about 20° C. above the normal melting point of the resin to 100° C. above the normal melting point of the resin and in the amount of about 1 kg to 20 kg of blowing agent per 100 kg of resin, the polyethylene resin composition comprising polyethylene, glycerol monostearate in an amount of from about 0.5 kg to 5 kg per 100 kg of resin, and zinc oxide in an amount of from about 0.05 to 0.5 kg per 100 kg of resin;

b) extruding the mixture of blowing agent and resin composition at a temperature in the range of from about 85° C. to 100° C. through the die of an extruder; and c) expanding the mixture to produce a dimensionally stable foam product having a density after seven days of from about 20 to about 40 kg/m$^3$.

* * * * *